US010860647B2

(12) United States Patent
Scott et al.

(10) Patent No.: US 10,860,647 B2
(45) Date of Patent: Dec. 8, 2020

(54) SYSTEMS, METHODS, AND APPARATUS TO IMPROVE MEDIA IDENTIFICATION

(71) Applicant: Gracenote, Inc., Emeryville, CA (US)

(72) Inventors: Jeffrey Scott, Berkeley, CA (US); Matthew James Wilkinson, Emeryville, CA (US); Robert Coover, Orinda, CA (US); Shashank Merchant, Sunnyvale, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

(21) Appl. No.: 16/528,237

(22) Filed: Jul. 31, 2019

(65) Prior Publication Data

US 2020/0081914 A1 Mar. 12, 2020

Related U.S. Application Data

(60) Provisional application No. 62/727,905, filed on Sep. 6, 2018.

(51) Int. Cl.
*G06F 16/683* (2019.01)
*G06K 9/62* (2006.01)
(Continued)

(52) U.S. Cl.
CPC ............ *G06F 16/683* (2019.01); *G06F 16/65* (2019.01); *G06F 16/9014* (2019.01); *G06K 9/0055* (2013.01); *G06K 9/6231* (2013.01)

(58) Field of Classification Search
CPC . G06F 3/16; G06F 3/162; G06F 3/165; G06F 16/137; G06F 16/148;
(Continued)

(56) References Cited

U.S. PATENT DOCUMENTS 8,145,656 B2 3/2012 Shatz et al.
8,886,531 B2 11/2014 Vogel
(Continued)

FOREIGN PATENT DOCUMENTS

GB 2485694 A 5/2012

OTHER PUBLICATIONS

Wilkinson, Matthew, "Indexing Fingerprints," U.S. Appl. No. 15/445,615, filed Feb. 28, 2017, 33 pages.
(Continued)

*Primary Examiner* — Andrew C Flanders
(74) *Attorney, Agent, or Firm* — Hanley, Flight & Zimmerman, LLC

(57) ABSTRACT

Methods, apparatus, systems, and articles of manufacture are disclosed to improve media identification. An example apparatus includes a hash handler to generate a first set of reference matches by performing hash functions on a subset of media data associated with media to generate hashed media data based on a first bucket size, a candidate determiner to identify a second set of reference matches that include ones of the first set, the second set including ones having first quantities of hits that did not satisfy a threshold, determine second quantities of hits for ones of the second set by matching ones to the hash tables based on a second bucket size, and identify one or more candidate matches based on at least one of (1) ones of the first set or (2) ones of the second set, and a report generator to generate a report including a media identification.

22 Claims, 8 Drawing Sheets

(51) Int. Cl.
*G06F 16/65* (2019.01)
*G06F 16/901* (2019.01)
*G06K 9/00* (2006.01)

(58) Field of Classification Search
CPC .... G06F 16/152; G06F 16/2255; G06F 16/60; G06F 16/61; G06F 16/63; G06F 16/632; G06F 16/638; G06F 16/65; G06F 16/683; G06F 16/685; G06F 16/686; G06F 16/90; G06F 16/901; G06F 16/9014; G06F 16/9017; G06F 16/902; G10L 25/51; G10L 25/54; G10L 25/72; G06K 9/00543; G06K 9/00523; G06K 9/0053; G06K 9/0055; G06K 9/6231
See application file for complete search history.

(56) References Cited

U.S. PATENT DOCUMENTS

| | | |
|---|---|---|
| 9,286,902 B2 | 3/2016 | Han et al. |
| 10,229,689 B2 | 3/2019 | Han et al. |
| 2004/0179720 A1 | 9/2004 | Chen et al. |
| 2011/0246489 A1 | 6/2011 | Pope et al. |
| 2011/0173208 A1* | 7/2011 | Vogel .................. G06F 16/683 707/746 |
| 2011/0299721 A1* | 12/2011 | He .................... G06K 9/00744 382/100 |
| 2013/0046767 A1 | 2/2013 | Lee et al. |
| 2013/0326573 A1* | 12/2013 | Sharon .................. H04H 60/73 725/115 |
| 2014/0002749 A1* | 1/2014 | Pora .................. H04N 21/6582 348/725 |
| 2014/0280127 A1 | 9/2014 | Wang et al. |
| 2015/0088890 A1* | 3/2015 | Hoffert ............. G06F 16/24553 707/737 |
| 2016/0110605 A1 | 4/2016 | Holzschneider et al. |
| 2016/0154880 A1* | 6/2016 | Hoarty ................ G06F 16/7834 707/770 |
| 2017/0309298 A1 | 10/2017 | Scott et al. |
| 2018/0004745 A1* | 1/2018 | Finkelstein ......... G06F 16/2255 |
| 2019/0244624 A1 | 8/2019 | Han et al. |

OTHER PUBLICATIONS

Bhatia et al., "An Efficient Hash Count Indexing and Searching Scheme for Audio Fingerprinting," International Journal of Science and Research (IJSR), v3 issue 9, pp. 1910-1915, Sep. 2014, 6 pages.

International Searching Authority, "Written Opinion," issued in connection with International Patent Application No. PCT/US2019/049357, dated Dec. 20, 2019 (6 pages).

International Searching Authority, "Search Report," issued in connection with International Patent Application No. PCT/US2019/049357, dated Dec. 20, 2019 (4 pages).

* cited by examiner

SYSTEMS, METHODS, AND APPARATUS TO IMPROVE MEDIA IDENTIFICATION

RELATED APPLICATION

This patent arises from an application claiming the benefit of U.S. Provisional Patent Application Ser. No. 62/727,905, which was filed on Sep. 6, 2018. U.S. Provisional Patent Application Ser. No. 62/727,905 is hereby incorporated herein by reference in its entirety. Priority to U.S. Provisional Patent Application Ser. No. 62/727,905 is hereby claimed.

FIELD OF THE DISCLOSURE

This disclosure relates generally to data indexing and, more particularly, to systems, methods, and apparatus to improve media identification.

BACKGROUND

Audio information (e.g., sounds, speech, music, or any suitable combination thereof) may be represented as digital data (e.g., electronic, optical, or any suitable combination thereof). For example, a piece of music, such as a song, may be represented by audio data, and such audio data may be stored, temporarily or permanently, as all or part of a file (e.g., a single-track audio file or a multi-track audio file). In addition, such audio data may be communicated as all or part of a stream of data (e.g., a single-track audio stream or a multi-track audio stream).

Figure 1:
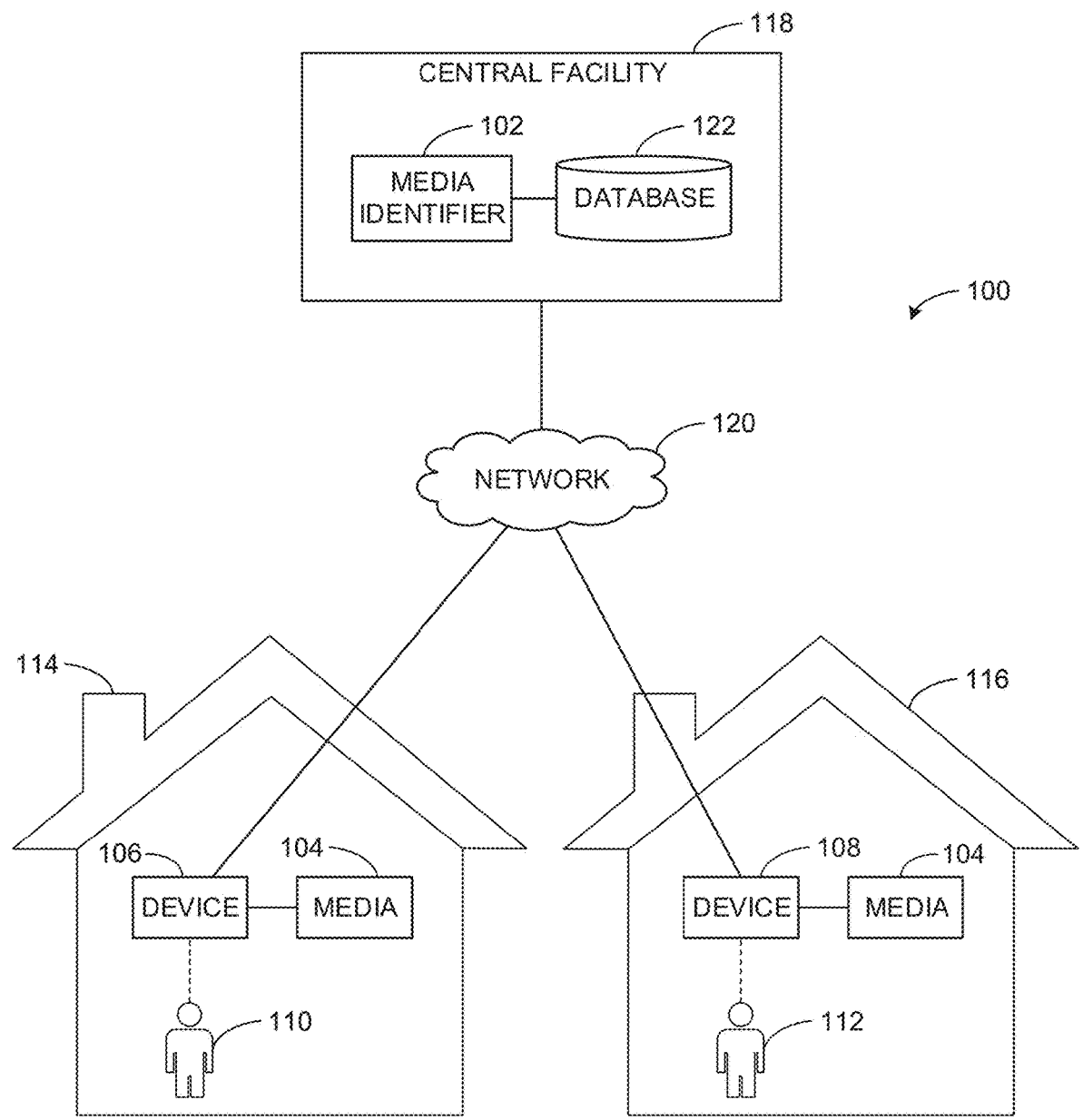
FIG. 1 is an example environment in which an example media identifier identifies example media.

The figures are not to scale. Instead, the thickness of the layers or regions may be enlarged in the drawings. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A machine (e.g., an audio identifier, a media identifier, a media processing machine, etc.) may form all or part of an audio fingerprinting system, and such a machine may be configured (e.g., by software modules) to generate one or more audio fingerprints of one or more segments of audio data, media data, etc. Audio fingerprints, or audio signatures, are typically formed by sampling and converting audio from a time domain to a frequency domain, and then using predetermined features from the frequency domain to form the fingerprint. For example, the conversion from the time domain to the frequency domain may be implemented by using a Fourier transform (e.g., a Fast-Fourier transform). The frequency-domain audio may then be used to extract a fingerprint therefrom (i.e., data expressing information inherent to an audio signal) for use in identifying the audio signal or obtaining other information concerning the audio signal (e.g., a source or distribution path thereof).

Some prior systems store audio fingerprints, or portions thereof (e.g., a sub-fingerprint), at one or more indices included in a hash table based on processing the audio fingerprints, or portions thereof, with a hash algorithm. In some instances, the prior systems looked in buckets under a given size, S, when looking up a sub-fingerprint in an index of the hash table. As used herein, a "bucket" refers to an array index of a given size in a hash table. In prior systems, data included in a bucket that has a size greater than S may be excluded from the querying operation.

Examples disclosed herein improve accuracy and/or efficiency of identifying media by performing a multi-round limited bucket size lookup. As used herein, the term "media" includes any type of content and/or advertisement delivered via any type of distribution medium. Thus, media includes television programming or advertisements, radio programming or advertisements, movies, web sites, streaming media, etc.

Examples disclosed herein increase a search depth of indexed databases by performing the multi-round limited bucket size lookup. In some disclosed examples, a candidate list is generated by performing a first pass, or a first query round, through an indexed database on buckets having a first bucket size. A bucket size can correspond to a quantity of items or storage capacity of data in a bucket (e.g., a search bucket) of the indexed database. For example, the first bucket size can correspond to a bucket including a first quantity of entries less than S. In such examples, where S is 4096, buckets including more than 4096 entries (e.g., 4096 entries where each entry is 16 bits, 32 bits, 64 bits, etc. can be excluded from the first pass. For each candidate in the candidate list, examples disclosed herein search buckets having a second bucket size, or a second quantity of entries greater than S and less than L, where L is substantially larger than S. For example, where L is 256,000 (e.g., 256,000 entries where each entry is 16 bits, 32 bits, 64 bits, etc.), buckets including more than 256,000 items can be excluded.

In some disclosed examples, the buckets can be searched in linear time as an identifier (ID) of ones of the candidates in the candidate list are known and the buckets are stored in sorted order. In some disclosed examples, the buckets during the first pass are combined via a divide-and-conquer algorithm e.g., merge sort) or any other comparison-based sorting algorithm. In some disclosed examples, one or more candidates in the candidate list have a quantity of hash hits that satisfy a first threshold (e.g., a candidate threshold) of hash hits. By satisfying the first threshold, the one or more candidates can be further evaluated in a candidate evaluation stage during which the media of interest can be identified.

In some disclosed examples, a candidate that has at least one hash hit, but does not have enough hash hits to satisfy the first threshold, can be boosted to potentially increase the respective quantities of hash hits. Boosting can correspond to processing a candidate with a lower match threshold (e.g., a threshold less than the first threshold) by executing a second pass by conducting a deeper search range (e.g., a larger search range) into the indexed database if the first pass does not yield a desired number of candidates satisfying the first threshold when using a typical match threshold and/or a typical maximum index bucket size. Accordingly, boosting can correspond to identifying one or more candidates that did not satisfy the first threshold, but satisfy a second threshold (e.g., a boost threshold) of hash hits, as boost candidates, and expanding the search depth to increase the quantity of hash hits for the boost candidates to potentially satisfy the first threshold. In such examples, the second threshold of hash hits is less than the first threshold of hash hits.

A boost candidate can correspond to a candidate in the candidate list that, after performing a first pass through one or more hash tables using search buckets including a first quantity of entries, do not have enough hash hits to proceed with the candidate evaluation stage. The hash hits of the boost candidate can be boosted by performing a second pass using search buckets including a second quantity of entries greater than the first quantity of entries used in the first pass. In some disclosed examples, the second pass can return additional hash hits for the boost candidate and, in combination with the hash hits from the first pass, may result in a quantity of total hash hits that satisfy the first threshold. If the quantity of total hash hits satisfies the first threshold, the corresponding boost candidates can be further evaluated in the candidate evaluation stage. Advantageously, by boosting the number of hash hits for the boost candidates, examples disclosed herein can identify an increased number of candidate reference matches compared to prior systems.

FIG. 1 is an example environment 100 in which an example media identifier 102 identifies media 104. The example environment 100 includes example devices 106, 108 including a first example device 106 and a second example device 108 operated by example users 110, 112 including a first example user 110 and a second example user 112. One or both users 110, 112 may be human users (e.g., a human being), a machine user (e.g., a computer configured by a software program to interact with the devices 106, 108), or any suitable combination thereof (e.g., a human assisted by a machine or a machine operated or supervised by a human).

In FIG. 1, the devices 106, 108 are operating in example media exposure measurement locations 114, 116 including a first example media exposure measurement location 114 and a second example media exposure measurement location 116. The media exposure measurement locations 114, 116 of the illustrated example of FIG. 1 are households. However, the media exposure measurement locations 114, 116 may be any other location, such as, for example an Internet café, an office, an airport, a library, a music venue, etc., or any other public environment. While, in the illustrated example, two single media exposure measurement locations 114, 116 are shower, number and/or type(s) of media exposure measurement locations may be used.

In the illustrated example of FIG. 1, the devices 106, 108 are media devices that access and/or present media (e.g., present audio, video, etc., and/or a combination thereof to the users 110, 112). The devices 106, 108 of FIG. 1 are consumer electronic devices. For example, the devices 106, 108 of FIG. 1 are Internet-enabled mobile handsets (e.g., a smartphone, an iPod®, etc.). In other examples, the devices 106, 108 are personal computers such as laptop computers, tablet computers (e.g., an iPad®, a MICROSOFT™ SURFACE™, etc.), smart televisions, etc. While in the illustrated example, the devices 106, 108 are shown, any other type(s) and/or number(s) of device(s) may additionally or alternatively be used. For example, Internet-enabled mobile handsets (e.g., a smartphone, an iPod®, etc.), video game consoles (e.g., Xbox®, PlayStation 4, etc.), tablet computers (e.g., an iPad®, a Microsoft Surface, etc.), digital media players (e.g., a Roku® media player, a Slingbox®, a TiVo®, etc.), smart televisions, desktop computers, laptop computers, servers, etc., may additionally or alternatively be used.

In the illustrated example of FIG. 1, the devices 106, 108 are operative to obtain and/or otherwise process the media 104. The media 104 may be obtained from the Internet, stored locally on the devices 106, 108, stored on an external device to the devices 106, 108, etc. The devices 106, 108 may generate one or more fingerprints based on accessing the media 104. For example, one or both devices 106, 108 may capture and/or otherwise process audio associated with the media 104 and generate one or more fingerprints, spectrograms based on the one or more fingerprints, etc., based on the audio (e.g., data associated with the audio). For example, the media identifier 102 may obtain a fingerprint from one of the devices 106, 108, where the fingerprint is associated with a song accessed by and/or otherwise presented by the one of the devices 106, 108. In other examples, the fingerprint can be associated with media presented on a television (e.g., a television show, a movie, etc.) or any other media presentation device.

In FIG. 1, the media 104 accessed by the devices 106, 108 are the same media. Alternatively, the devices 106, 108 may access different media. For example, the first device 106 may capture first audio associated with a first media and the second device 108 may capture second audio associated with a second media, where the first media and the sec media are different.

In FIG. 1, the devices 106, 108 transmit media information e.g., audio data, fingerprints, spectrograms, etc.) to an example central facility 118 via an example network 120. For example, the devices 106, 108 may be query devices. In some examples, the devices 106, 108 transmit the media information as the media information is obtained. In some examples, the devices 106, 108 transmit the media information after a time period has elapsed. For example, the devices 106, 108 may transmit the media information every 100 milliseconds, every hour, every day, etc.

The network 120 of the illustrated example of FIG. 1 is the Internet. However, the network 120 may be implemented using any suitable wired and/or wireless network(s) including, for example, one or more data buses, one or more Local Area Networks (LANs), one or more wireless LANs, one or more cellular networks, one or more private networks, one or more public networks, etc. The network 120 enables the example devices 106, 108 to be in communication with the central facility 118.

In the illustrated example of FIG. 1, the central facility 118 includes the media identifier 102 to obtain and process media data from the devices 106, 108 to identify the media 104. For example, the media identifier 102 may obtain media data including fingerprints, timestamps associated with the fingerprints, one or more peaks corresponding to energy values at frequencies with respect to time of the fingerprints, etc. In other examples, the media identifier 102 can obtain device information (e.g., data associated with the devices 106, 108), user information (e.g., demographic data associated with the users 110, 112, etc.), network information, etc.

In some examples, the media identifier 102 generates one or more hash tables based on reference media information. For example, the media identifier 102 may select reference audio data of interest to process. In such examples, the media identifier 102 can select a spectrogram, one or more data points included in the spectrogram, etc., to process. In some examples, the media identifier 102 processes the one or more data points included in the spectrogram with one or more hash algorithms, one or more hash functions, one or more hash operations, etc. The media identifier 102 may store hash values associated with ones of the processed data points in the hash tables at a corresponding index of the hash tables, in a slot at the corresponding index, etc.

In some examples, the media identifier 102 queries one or more hash tables using media data obtained from one or both devices 106, 108. For example, the media identifier 102 may receive audio data associated with the media 104, a spectrogram associated with the audio data, etc., from the first device 106. In some examples, the media identifier 102 selects one or more data points included in the audio data, the spectrogram, etc., to generate hash values using a plurality of hash algorithms, and queries the hash tables for reference matches using a first bucket size.

In some examples, a reference match corresponds to a data entry in a hash table at a bucket number, where the data entry includes at least one of a media identifier (ID) or a time offset. For example, the media ID may correspond to at least one of a music artist, a song name, or any other type of media identification information. The media ID points to first media in another database. For example, the media identifier 102 may retrieve the first media stored in another database corresponding to the media ID. The media identifier 102 may retrieve the first media to identify the media 104 of FIG. 1.

In some examples, the time offset corresponds to a timestamp with respect to a baseline timestamp, where the baseline timestamp may be a first time value of the first media. For example, the reference match may correspond to a media ID and a time offset, where the media ID and the time offset correspond to previously processed and stored audio data. The media identifier 102 may generate a first buffer including the reference matches by sorting and/or otherwise processing the reference matches. The media identifier 102 may determine a number of times that the media ID appears in the first buffer. For example, the media identifier 102 may determine a quantity of hits, or a quantity of times, that a media ID associated with a particular music artist, song name, etc., appears in the first buffer.

In some exaples, the media identifier 102 identifies a set of candidates based on the quantity of hits. For example, the media identifier 102 may determine that a first reference match including a first media. ID has 47 hits corresponding to the first media. ID appearing 47 times in the first buffer. In such examples, the media identifier 102 can compare the quantity of hits to a threshold (e.g., a candidate threshold, a hit threshold, a hash hit threshold, etc.) of 7 hits, and determine that the first reference match satisfies the threshold based on the quantity of hits being greater than the threshold. The media identifier 102 may identify the reference match having 47 hits as a candidate match based on the 47 hits satisfying, matching, and/or exceeding the candidate threshold of 7 hits.

In some examples, the media identifier 102 identifies reference matches that have at least one hash hit but do not satisfy the candidate threshold. For example, a second reference match having a second media ID may not satisfy the candidate threshold but may satisfy a second threshold (e.g., a boost threshold, a boost hit threshold, etc.). The second reference matching satisfying the second threshold, such as the boost threshold, can correspond to a reference match that, after performing a first pass, or a first query, using search buckets having a first size may not have enough hash hits to proceed with further evaluation. However, if the second reference match satisfies the boost threshold then the second reference match can be identified as a boost candidate (e.g., a candidate for boosting a quantity of hash hits associated with the second reference match) and, thus, selected to proceed for further evaluation by performing a second pass, or a second query, using search buckets having a second size greater than the first size. Advantageously, by selecting a subset of the reference matches (e.g., the second reference match, the one or more boost candidates, for further processing based on the increase in bucket size, the media identifier 102 may determine that the one or more boost candidates have an increased quantity of hash hits. Accordingly, in some examples, the increased quantity of the hash hits from the second pass, in combination with the hash hits from the first pass, may satisfy the candidate threshold. Advantageously, by boosting the number of hash hits for the one or more boost candidates, media identifier 102 can identify an increased number of candidate reference matches compared to prior systems.

For example, the reference matches having a quantity of hits less than the candidate threshold but equal and/or greater than the boost threshold are identified as boost candidates and, thus, are selected for additional processing to boost the quantity of hits of the reference matches. For example, the second reference match having 5 hits does not satisfy the candidate threshold of 7 hits but satisfies the boost threshold of 3 hits and, thus, the second reference match can be referred to and/or otherwise classified or identified as a boost candidate. In such examples, the 5 hits can correspond to a first quantity of hits based on a first bucket size of the hash table.

In some examples, the media identifier 102 processes the second reference match by searching the hash table using a second bucket size, where the second bucket size is greater than the first bucket size. For example, the media identifier 102 may search the hash table at bucket sizes greater than the first bucket size and/or bucket sizes up to and/or including the second bucket size. The media identifier 102 may search the hash table in linear time as the media identifier 102 has already identified the media. ID associated with the second reference match and the buckets of the hash table are in sorted order. The media identifier 102 may generate a second buffer including the reference matches based on the first bucket size and the reference matches based on the second bucket size by sorting and/or otherwise processing the reference matches. The media identifier 102 may determine a number of times that the second media ID appears in the second buffer. For example, the media identifier 102 may determine the quantity of hits that the second media ID associated with a particular music artist, song name, etc., appears in the second buffer. For example, if the second media ID appears in the second buffer 3 times, the 3 hits can correspond to a second quantity of hits based on a second bucket size of the hash table, where the second bucket size is different (e.g., larger) from the first bucket size.

In some examples, the media identifier 102 determines the first quantity of hits and the second quantity of hits for the second reference match. In some examples, the media identifier 102 adds the first quantity of hits (e.g., 5 hits) based on the first bucket size of the hash table to the second quantity of hits (e.g., 3 hits) based on the second bucket size of the hash table to determine a third quantity of hits (e.g., 8 hits). In some examples, the media identifier 102 compares the third quantity of hits (e.g., 8 hits) to the candidate threshold (e.g., 7 hits) and determines whether the third quantity of hits satisfies the candidate threshold based on the comparison. For example, the media identifier 102 may compare the 8 hits based on the first and second quantities of hits to the candidate threshold of 7 hits and determine that the 8 hits satisfy the candidate threshold because the 8 hits are greater than or equal to the 7 hits. In such examples, the media identifier 102 can identify or classify the second reference match as a candidate match based on the third quantity of hits satisfying the candidate threshold.

In some examples, the reference matches have a first quantity of hits based on the first bucket size, a second quantity of hits based on the second bucket size, and a third quantity of hits by adding the first quantity and the second quantity. In some examples, the first quantity of hits can be less than the second quantity of hits based on the second bucket size because of the increase in bucket size from the first bucket size to the second bucket size. For example, the increase in bucket size may result to a greater quantity of hits. In some examples, the reference matches (1) having the first quantity of hits based on the first bucket size do not satisfy the candidate threshold but (2) having the third quantity of hits satisfy the candidate threshold because of the second quantity of hits based on the second bucket size. For example, the second reference match may have (1) 4 hits by searching the hash table based on the first bucket size, (2) 8 hits by searching the hash table based on the second bucket size, and (3) 12 hits based on the first and second bucket size. In such examples, the second reference match does not satisfy the candidate threshold based on the first bucket size but satisfies the candidate threshold based on the processing the second reference match using the second bucket size. The media identifier 102 identifies a greater number of candidate matches compared to prior systems, which may have excluded the second reference match by not performing another querying, processing, or searching round based on an increase in bucket size.

In some examples, the media identifier 102 compares the media data to ones of the candidate matches to identify and/or otherwise determine a match. For example, the media identifier 102 may identify the media 104 from the devices 106, 108 by comparing the associated media data to the candidate matches and identifying the media 104 based on the comparison. In some examples, the media identifier 102 returns the identification of the media 104 to the devices 106, 108. In other examples, the media identifier 102 can generate a report including the identification of the media 104. In some examples, the devices 106, 108 present the identification of the media 104 to the users 110, 112 via the devices 106, 108.

In the illustrated example of FIG. 1, the central facility 118 includes an example database 122 to record data (e.g., obtained media information, spectrograms, audio data, reference data, reference identifiers, hash tables, etc.). The database 122 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or anon-volatile memory (e.g., flash memory). The database 122 may additionally or alternatively be implemented by one or more double data rate (DDR) memories, such as DDR, DDR2, DDR3, mobile DDR (mDDR), etc. The database 122 may additionally or alternatively be implemented by one or more mass storage devices such as hard disk drive(s), compact disk drive(s) digital versatile disk drive(s), etc. While in the illustrated example the database 122 is illustrated as a single database, the database 122 may be implemented by any number and/or type(s) of databases. Furthermore, the data stored in the database 122 may be in any data format such as, for example, binary data, comma delimited data, tab delimited data, structured query language (SQL) structures, etc.

Figure 2:
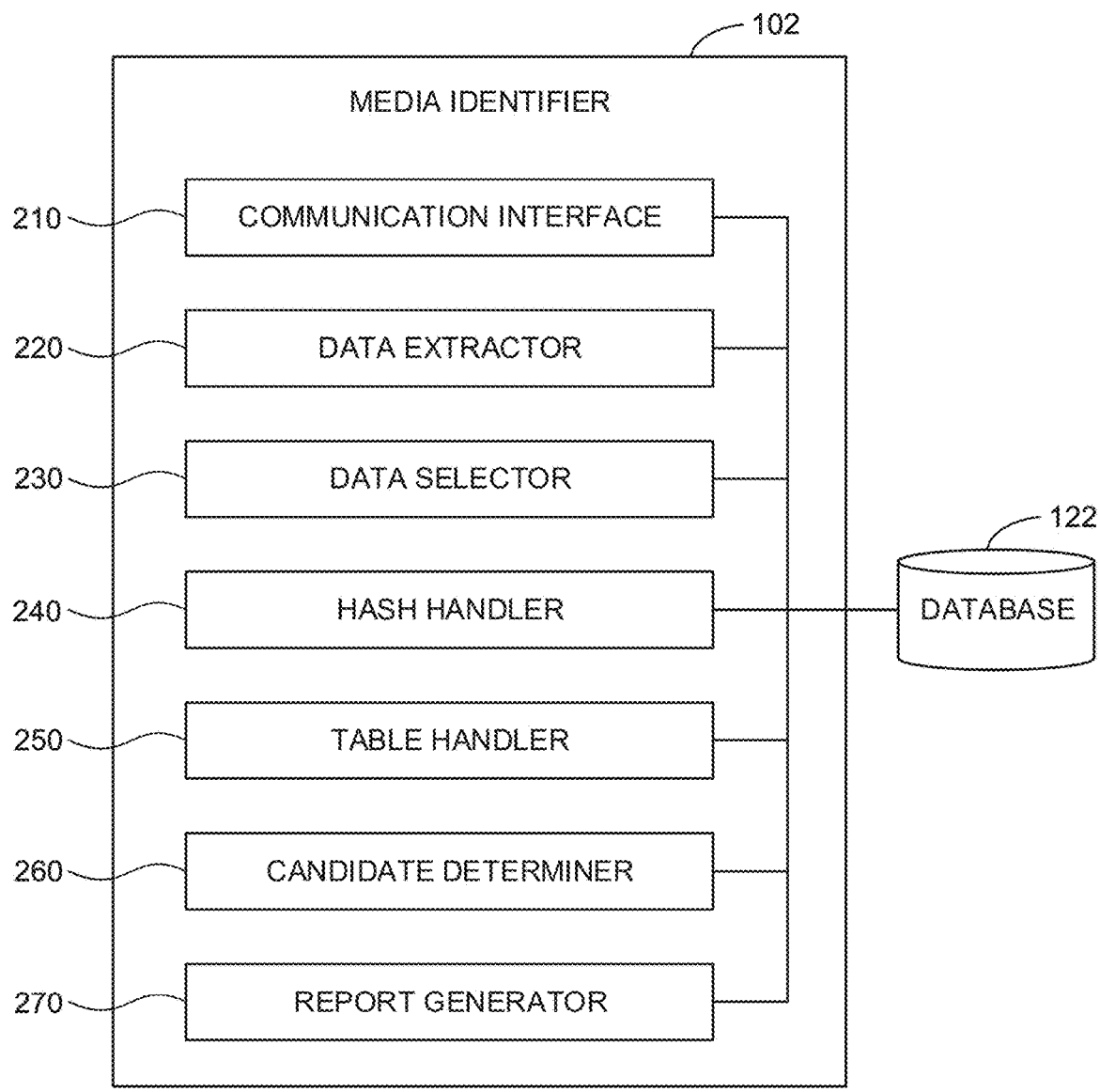
FIG. 2 is a block diagram of an example implementation of the example media identifier of FIG. 1.

FIG. 2 is a block diagram of an example implementation of the media identifier 102 of FIG. 1. The media identifier 102 obtains and processes media data from one or both devices 106, 108 of FIG. 1 to identify the media 104. In the illustrated example of FIG. 2, the media identifier 102 includes an example communication interface 210, an example data extractor 220, an example data selector 230, an example hash handler 240, an example table handler 250, an example candidate determiner 260, and an example report generator 270.

In the illustrated example of FIG. 2, the media identifier 102 includes the communication interface 210 to facilitate communication between the media identifier 102 and/or, more generally, the central facility 118 of FIG. 1 and the devices 106, 108. The communication interface 210 implements means for transmitting and/or means for receiving Internet messages (e.g., a HyperText Transfer Protocol (HTTP) request(s)) that include the media information. The means for transmitting and/or the means for receiving is/are implemented by executable instructions, which may be executed on one or more processors such as the example processor 812 shown in the example of FIG. 8. The means for transmitting and/or the means for receiving may additionally or alternatively be implemented by hardware logic, hardware implemented state machines, logic circuitry, and/or any other combination of hardware, software, and/or firmware. Additionally or alternatively, any other method(s) to receive and/or transmit media information may be used such as, for example, an HTTP Secure protocol (HTTPS), a file transfer protocol (FTP), a secure file transfer protocol (SFTP), etc. In some examples, the communication interface 210 transmits a request for information media information, device information of the devices 106, 108, demographic information of the users 110, 112, etc.) to the devices 106, 108. In some examples, the communication interface 210 stores obtained media information in the database 122.

In the illustrated example of FIG. 2, the media identifier 102 includes the data extractor 220 to process media information by categorizing, filtering, sorting, etc., the media information. The data extractor 220 implements means for extracting and/or means for generating (e.g., first means for generating) a spectrogram based on the media information from the devices 106, 108. In some examples, the data extractor 220 extracts and/or otherwise generates a list of audio data values (e.g., amplitudes, frequencies, energy values, etc.) based on the media information from the devices 106, 108.

Figure 8:
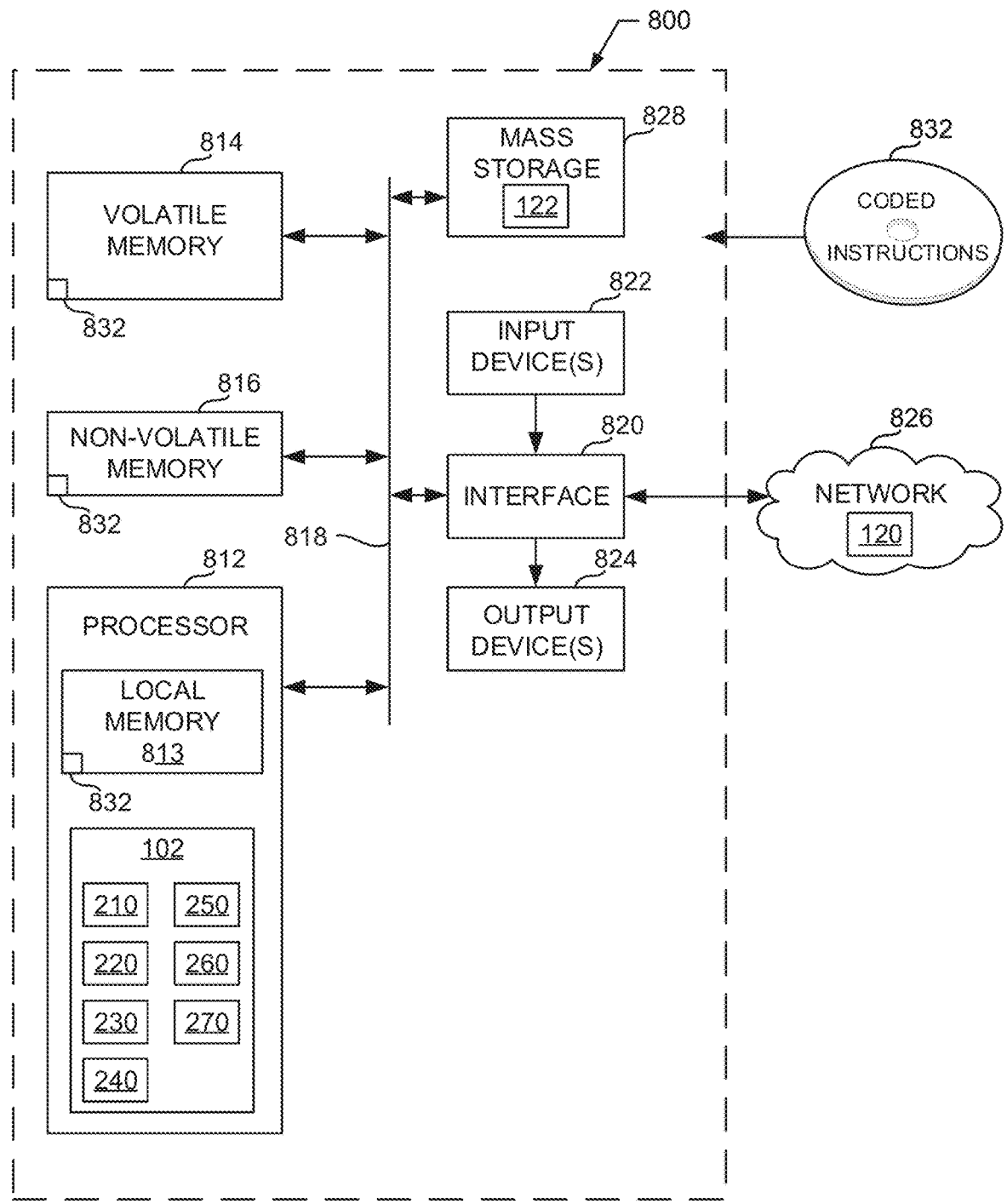
FIG. 8 is a block diagram of an example processing platform structured to execute the example machine readable instructions of FIG. 7 to implement the example media identifier of FIGS. 1-2.

The means for extracting and/or the means for generating is/are implemented by executable instructions, which may be executed on one or more processors such as the example processor 812 shown in the example of FIG. 8. The means for extracting and/or the means for generating may additionally or alternatively be implemented by hardware logic, hardware implemented state machines, logic circuitry, and/or any other combination of hardware, software, and/or firmware.

In the illustrated example of FIG. 2, the media identifier 102 includes the data selector 230 to select and/or otherwise identify data points of interest to process. In some examples, the data selector 230 implements means for identifying a data point in the media data obtained from the devices 106, 108 to process. For example, the data point may correspond to an energy value, an intensity value, a frequency, a time stamp, etc., and/or a combination thereof included in a spectrogram based on the media information. In some examples, the data selector 230 determines whether there is/are additional data point(s) included in the media data to process.

The means for identifying is implemented by executable instructions, which may be executed on one or more processors such as the example processor 812 shown in the example of FIG. 8. The means for identifying may additionally or alternatively be implemented by hardware logic, hardware implemented state machines, logic circuitry, and/or any other combination of hardware, software, and/or firmware.

In the illustrated example of FIG. 2, the media identifier 102 includes the hash handler 240 to perform a hash function. In some examples, the hash handler 240 implements means for executing and/or means for facilitating an operation of one or more hash algorithms to map media data (e.g., data of arbitrary size) to one or more buckets (e.g., data of a fixed size), where the one or more buckets include reference data. In some examples, the hash handler 240 generates a hash table based on media data, reference data, etc. For example, the hash handler 240 may obtain a data point of a first data size included in a spectrogram, and convert and/or otherwise translate the data point into a value of a second data size, where the second data size may be different than the first data size. The hash handler 240 implements means for mapping the data value of the second data size to a bucket, a slot at the bucket, etc., of the hash table. In some examples, the hash handler 240 queries a hash table including reference data with media data obtained from the devices 106, 108 to identify the media. 104 associated with the media data.

The means for executing, the means for facilitating, and/or the means for mapping are implemented by executable instructions, which may be executed on one or more processors such as the example processor 812 shown in the example of FIG. 8. The means for executing, the means for facilitating, and/or the means for mapping may additionally or alternatively be implemented by hardware logic, hardware implemented state machines, logic circuitry, and/or any other combination of hardware, software, and/or firmware.

In the illustrated example of FIG. 2, the media identifier 102 includes the table handler 250 to manage and/or otherwise manipulate a hash table. In some examples, the table handler 250 implements means for storing a hash value generated by the hash handler 240 in a hash table. In some examples, the table handler 250 implements means for returning one or more reference matches in response to a query based on media data obtained from the devices 106, 108.

The means for storing and/or the means for returning is implemented by executable instructions, which may be executed on one or more processors such as the example processor 812 shown in the example of FIG. 8. The means for storing and/or the means for returning may additionally or alternatively be implemented by hardware logic, hardware implemented state machines, logic circuitry, and/or any other combination of hardware, software, and/or firmware.

In the illustrated example of FIG. 2, the media identifier 102 includes the candidate determiner 260 to determine a likelihood that query media data (e.g., unidentified media, an unidentified song submitted as a candidate to be identified, etc.) matches reference media data (e.g., known media, a known song, known audio data, etc.). In some examples, the candidate determiner 260 implements means for querying the hash table that includes reference media data, in some examples, the candidate determiner 260 implements means for generating (e.g., second means for generating) fingerprints from multiple segments of media data and reference media data. For example, the candidate determiner 260 may generate first and second reference fingerprints from first and second segments of the reference media data, and the candidate determiner 260 may generate first and second query fingerprints from first and second segments of the query media data. For example, based on the four fingerprints (e.g., based on at least these four fingerprints), the candidate determiner 260 may determine a likelihood that the query media data matches the reference audio data and causes the devices 106, 108 to present the determined likelihood (e.g., as a response to a query from the users 110, 112).

In some examples, the candidate determiner 260 determines a candidate match based on determining a quantity of hits for ones of the reference matches. For example, the hash handler 240 may retain one or more reference matches by comparing a hash value to the hash table, where the hash value is generated by hashing one or more data values included in the query media data with a hash function. In some examples, the candidate determiner 260 calculates a quantity of hits by generating a data buffer by sorting the one or more reference matches and determining a number of times that a media ID appears in the data buffer. The candidate determiner 260 may identify one of the reference matches as a candidate match by comparing the quantity of hits to a candidate threshold and determining that the quantity of hits is greater than or equal to the candidate threshold and, thus, satisfies the candidate threshold.

In some examples, the candidate determiner 260 identifies a reference match that does not satisfy the candidate threshold. For example, the candidate determiner 260 may identify a reference match that does not satisfy the candidate threshold but satisfies a boost threshold. In such examples, the candidate determiner 260 can identify the reference match that satisfies the boost threshold as a boost candidate and, thus, can be selected for further processing. For example, in response to identifying the reference match for further processing, the candidate determiner 260 can determine a second quantity of hits by searching the one or more hash tables based on an increased bucket size, retrieving one or more reference matches based on the search, and generating another buffer including the retrieved one or more reference matches. The candidate determiner 260 may identify the reference match that did not initially satisfy the candidate threshold as a candidate match. For example, the candidate determiner 260 may compare a third quantity of hits based on the first and second quantity of hits to the candidate threshold and determine that the third quantity of hits is greater than the candidate threshold and, thus, satisfies the candidate threshold. In such examples, the third quantity of hits can be based on the increase in bucket size from the first bucket size to the second bucket size.

The means for querying and/or the means for generating (e.g., the second means for generating) is/are implemented by executable instructions, which may be executed on one or more processors such as the example processor 812 shown in the example of FIG. 8. The means for querying and/or the means for generating (e.g., the second means for generating) may additionally or alternatively be implemented by hardware logic, hardware implemented state machines, logic circuitry, and/or any other combination of hardware, software, and/or firmware.

In the illustrated example of FIG. 2, the media identifier 102 includes the report generator 270 to generate and/or prepare a report based on the media data, the reference matches, the boost candidates, the candidate matches, hit information (e.g., a quantity of hits), an identification of the media 104, etc. In some examples, the report generator 270 identifies the media 104 by comparing reference data associated with one or more of the candidate matches with media information associated with the media 104.

In some examples, the report generator 270 implements means for preparing and/or means for propagating media identification reports indicative of the exposure of the media 104 on the devices 106, 108 of FIG. 1. For example, the report generator 270 may generate a report and transmit the report to an audience measurement entity for further analysis, operations, processing, etc. In some examples, the report generator 270 generates a report identifying demographics associated with the media 104, where the demographics are based on the devices 106, 108, the users 110, 112, etc. In some examples, the report generator 270 may generate a report associating the obtained demographics with an identification of the media 104.

The means for preparing and/or the means for propagating is/are implemented by executable instructions, which may be executed on one or more processors such as the example processor 812 shown in the example of FIG. 8. The means for preparing and/or the means for propagating may additionally or alternatively be implemented by hardware logic, hardware implemented state machines, logic circuitry, and/or any other combination of hardware, software, and/or firmware.

While an example manner of implementing the media identifier 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example communication interface 210, the example data extractor 220, the example data selector 230, the example hash handler 240, the example table handler 250, the example candidate determiner 260, the example report generator 270, and/or, more generally, the example media identifier 102 of FIG. 1 may be implemented by hardware, software, firmware, and/or any combination of hardware, software, and/or firmware. Thus, for example, any of the example communication interface 210, the example data extractor 220, the example data selector 230, the example hash handler 240, the example table handler 250, the example candidate determiner 260, the example report generator 270, and/or, more generally, the example media identifier 102 could be implemented by one or more analog or digital circuit(s), logic circuits, programmable processor(s), programmable controller(s), graphics processing unit(s) (GPU(s)), digital signal processors) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example communication interface 210, the example data extractor 20, the example data selector 230, the example hash handler 240, the example table handler 250, the example candidate determiner 260, and/or the example report generator 270 is/are hereby expressly defined to include a non-transitory computer readable storage device or storage disk such as a memory, a digital versatile disk (DVD), a compact disk (CD), a Blu-ray disk, etc., including the software and/or firmware. Further still, the example media identifier 102 of FIG. 1 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, a periodic intervals, and/or one-time events.

Figure 3:
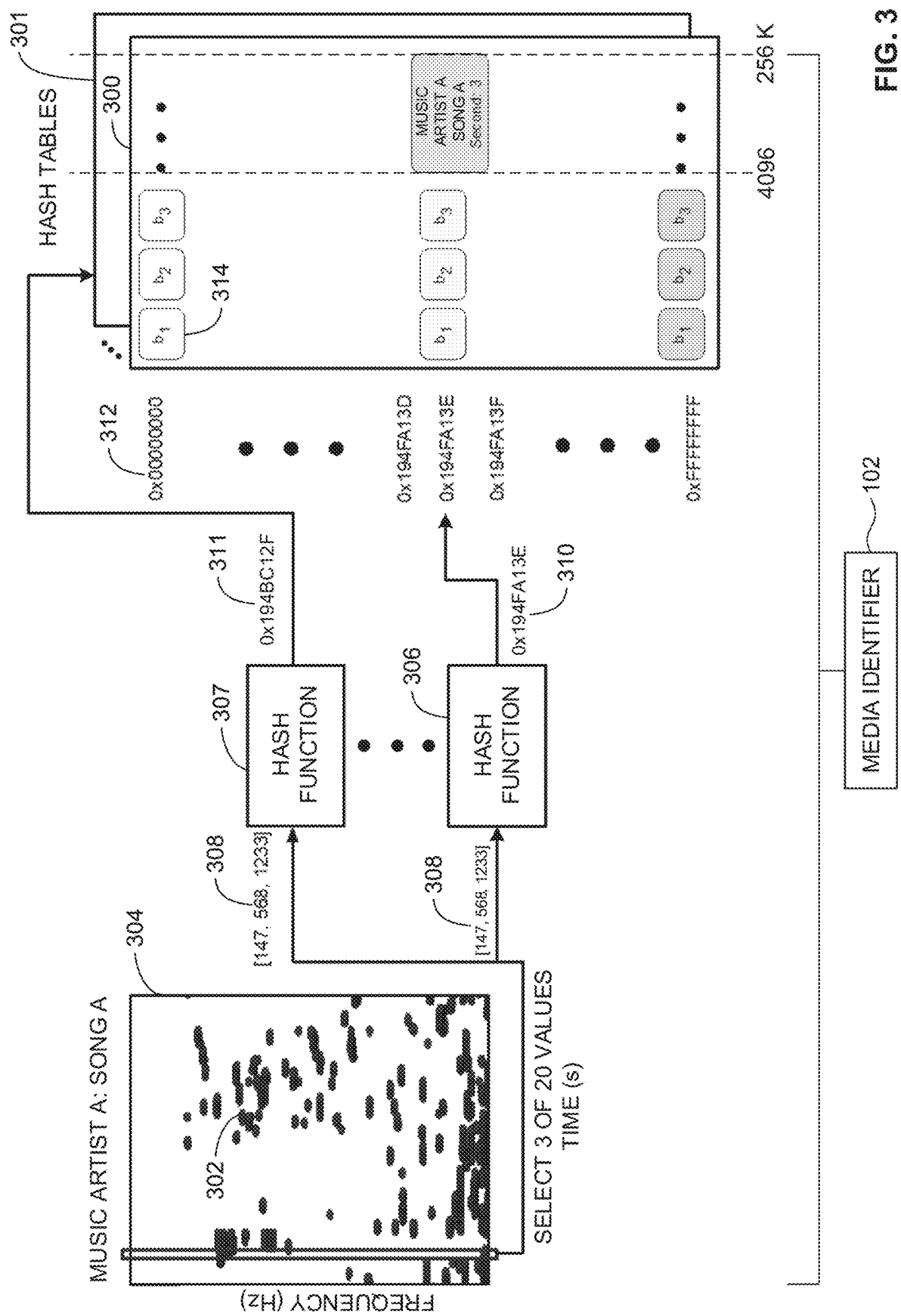
FIG. 3 is a schematic illustration of the example media identifier of FIGS. 1-2 generating an example hash table based on example media data using the examples disclosed herein.

FIG. 3 is a schematic illustration of the media identifier 102 of FIGS. 1-2 generating example hash tables 300, 301 based on example media data 302 included in an example spectrogram 304. In FIG. 3, the hash tables 300, 301 include a first hash table 300 and a second hash table 301. The hash tables 300, 301 of FIG. 3 may be stored in the database 122 of FIGS. 1-2. Alternatively, there may be fewer or more hash tables than the hash tables 300, 301 depicted in FIG. 3. The media data 302 of FIG. 3 corresponds to media data associated with Song A produced by Music Artist A. In some examples, the media data. 302 is obtained by the media identifier 102 prior to the devices 106, 108 of FIG. 1 accessing the media 104. The media data 302 includes energy values at frequencies with respect to a time or a timestamp of Song A. Alternatively, the media data 302 may include any other information associated with Song A.

In the illustrated example of FIG. 3, the media identifier 102 selects energy, values included in the media data 302 to be processed by example hash functions (e.g., cryptographic hash functions, computer hash functions, etc.) 306, 307. In FIG. 3, the media identifier 102 selects three example energy values 308 out of twenty prospective energy values for a given time. Alternatively, the media identifier 102 may select a different number of energy values. For example, the media identifier 102 may select one or more energy values to process. The media identifier 102 executes the hash functions 306, 307 on the selected three energy values 308 to generate example hash values 310, 311 including a first example hash value 310 and a second example hash value 311.

In the illustrated example of FIG. 3, the hash values 310, 311 are 24-bit values. Alternatively, the hash values 310, 311 may have a different size. The hash values 310, 311 are hash keys that correspond to example buckets (e.g., indices) 312 of the hash tables 300, 301. For example, the media identifier 102 may map the first hash value 310 to the first hash table 300 to determine whether data is stored in one or more example slots 314 stored at the bucket 312 of the first hash table 300. Alternatively, different hash values may be generated by using different hash functions for the hash functions 306, 307 of FIG. 3.

In the illustrated example of FIG. 3, the hash tables 300, 301 include one or more slots 314 for each of the buckets 312. The one or more slots 314 each have a data size. For example, each of the slots 314 may have a data size of 32 bits (e.g., 4 bytes). In such examples, slots $b_1$-$b_3$ may not have an aggregate size greater than 4096 bytes. In FIG. 3, the hash tables 300, 301 have a maximum data size of 256 kilobytes. Alternatively, one or both hash tables 300, 301 may have different maximum data sizes. In FIG. 3, the hash tables 300, 301 are indexed with the buckets 312 that range from 0x00000000 to 0xFFFFFFFF. Alternatively, the hash tables 300, 301 may have a different index range.

In the illustrated example of FIG. 3, the media identifier 102 selects a first one of the buckets 312 of the first hash table 300 and determines that there are three entries, or three of the slots 314, at the selected first bucket 312. For example, at the selected bucket 312, the media identifier 102 determines that there is a first slot ($b_1$) with a first slot size, a second slot ($b_2$) with a second slot size, and a third slot ($b_3$) with a third slot size, where the first slot size is smaller than the second slot size and the second slot size is smaller than the third slot size. Alternatively, the first slot size, the second slot size, and/or the third slot size may have the same size.

In some examples, the media identifier 102 stores media information associated with the media data 302 in $b_1$ when $b_1$ is empty or does not have any stored data. For example, the media identifier 102 may store a media ID corresponding to Music Artist A, Song A, etc., a time offset corresponding to a time position of the first set of three energy values, etc., in $b_1$. In other examples, the media identifier 102 can determine an alternative position to store/input the media information when $b_1$ is not empty. For example, the media identifier 102 may determine the alternative position in the first hash table 300 by performing a linear search, a binary search, a re-hash search, a hash chain, etc., and/or a combination thereof. In FIG. 3, the media identifier 102 may select a second set of three energy values to continue building and/or otherwise generating the hash tables 300, 301. The media identifier 102 may continue generating the hash tables 300, 301 until the media identifier 102 determines that there is no additional media data 302 included in the spectrogram 304 to process.

Figure 4:
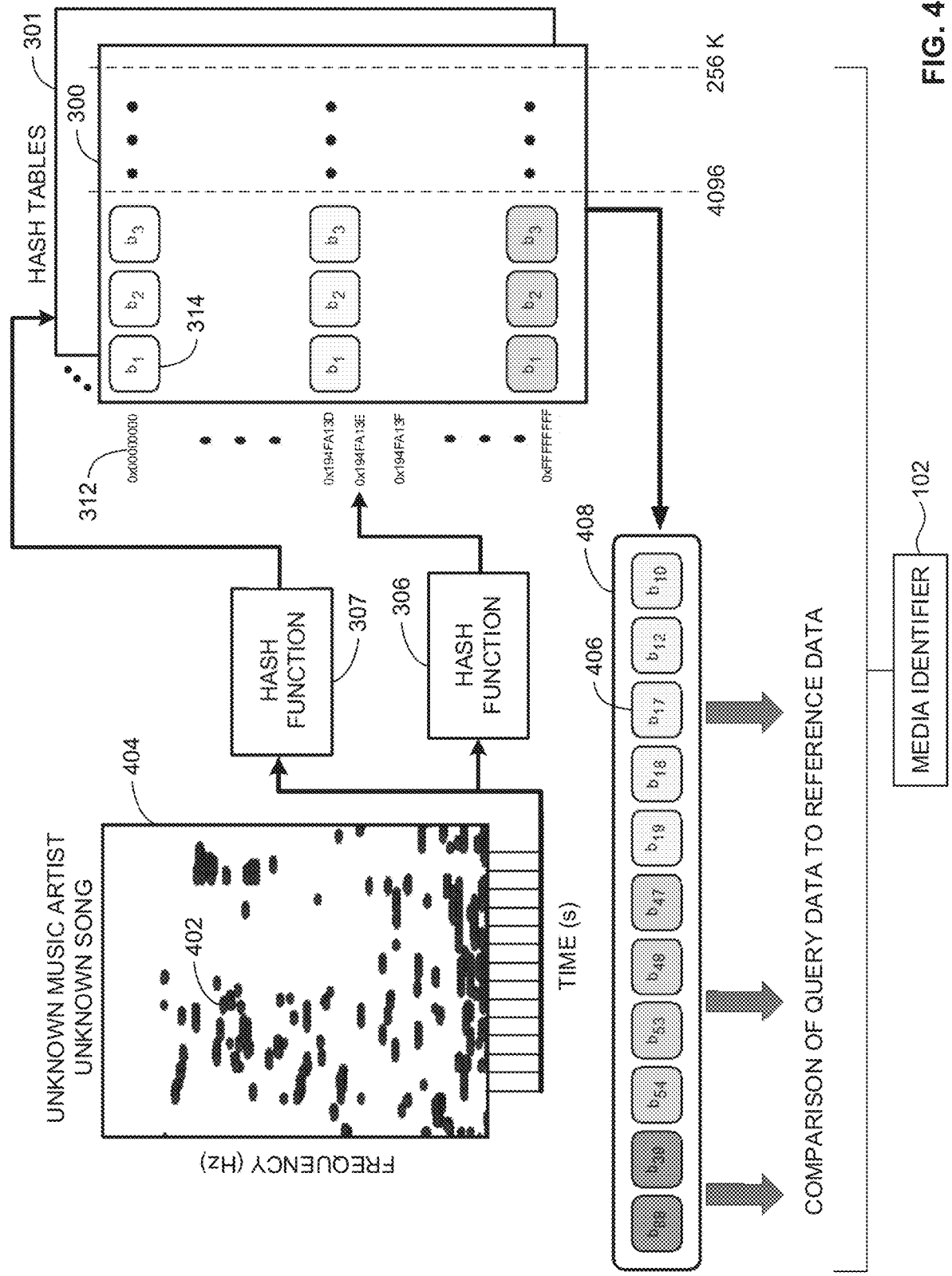
FIG. 4 is a schematic illustration of the example media identifier of FIGS. 1-2 identifying unknown media by performing a first look-up query using the examples disclosed herein.

FIG. 4 is a schematic illustration of the media identifier 102 of FIGS. 1-2 identifying example media data 402 associated with unknown or unidentified media by performing a first look-up query in the hash tables 300, 301 of FIG. 3. In FIG. 4, the media identifier 102 selects a first set of three data points included in the media data 402 at a first timestamp of an example spectrogram 404 and performs the hash functions 306, 307 of FIG. 3 on the selected three data points. Alternatively, fewer or more than three data points may be included in a set. The media identifier 102 generates hash values to determine a corresponding one of the buckets 312 of the hash tables 300, 301. In response to determining the corresponding one of the buckets 312 of the hash tables 300, 301, the media identifier 102 retrieves example reference data 406 stored in the slots 314 at the corresponding bucket 312.

In the illustrated example of FIG. 4, the media identifier 102 selects another set of three data points included in the media data 402 at a second timestamp, where the first timestamp is prior to the second timestamp, to determine another corresponding one of the buckets 312 of the hash tables 300, 301. The media identifier 102 selects (e.g., iteratively selects) sets of data points in the media data 402 until there are no additional sets of data points to process. In FIG. 4 the media identifier 102 identifies an example reference match set 408 including the reference data 406 of the corresponding slots 314 at identified ones of the buckets 312.

Figure 5:
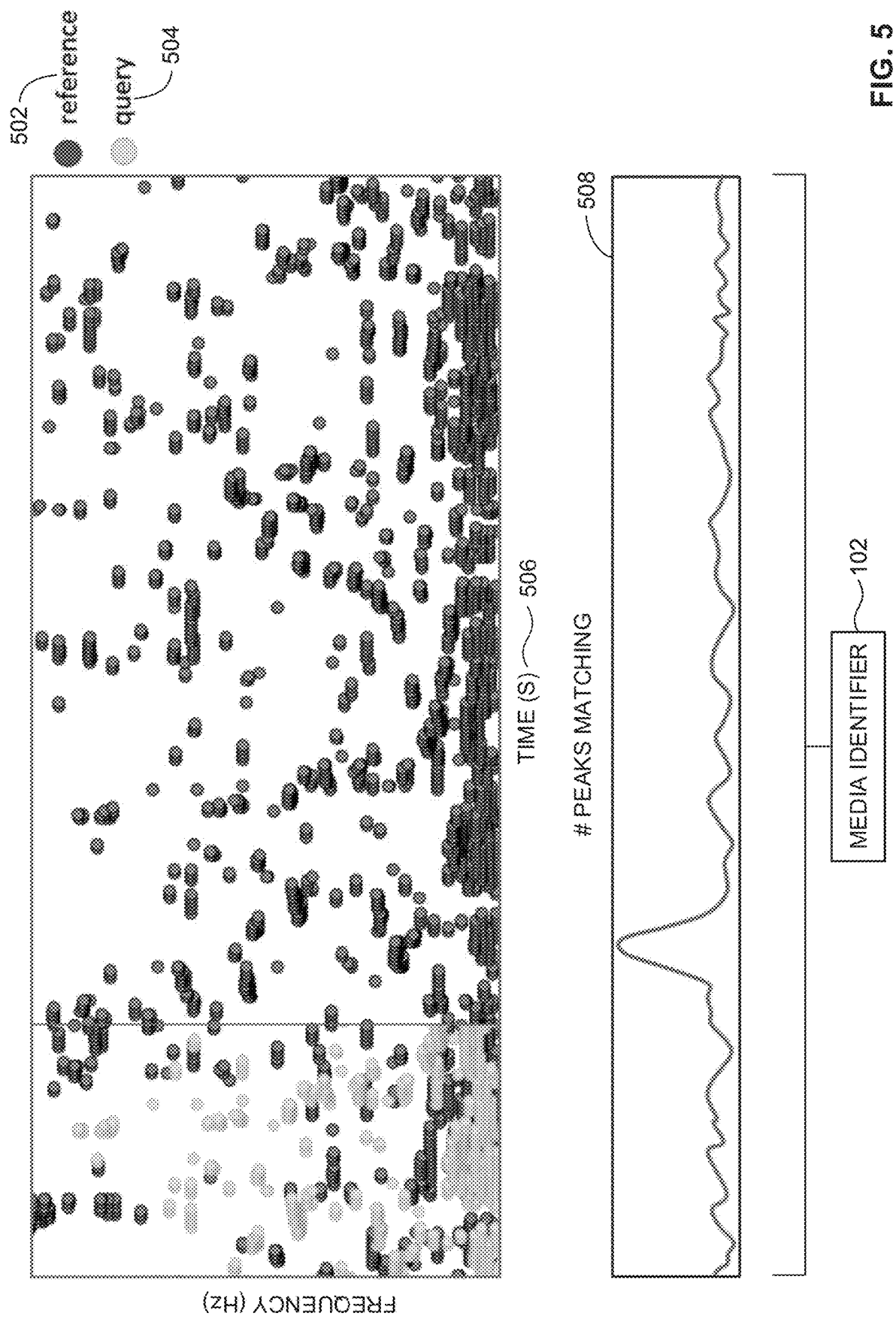
FIG. 5 is a schematic illustration of the example media identifier of FIGS. 1-2 identifying the unknown media of FIG. 4 by comparing query peaks and reference peaks.

FIG. 5 is a schematic illustration of the media identifier 102 of FIGS. 1-2 identifying the media data 402 of FIG. 4 corresponding to unknown media by comparing example reference peaks 502 and example query peaks 504. In FIG. 5, the reference peaks 502 are peak values (e.g., reference peak values) that correspond to reference data. In FIG. 5, the query peaks 504 are peak values (e.g., query peak values) that correspond to query data. The reference peaks 502 and the query peaks 504 correspond to enemy values at frequencies with respect to time. In FIG. 5, the reference peaks 502 correspond to the media data 302 of FIG. 3. In FIG. 5, the query peaks 504 correspond to the media data 402 of FIG. 4. For example, the media identifier 102 may retrieve the reference peaks 502 by using the media ID associated with one of the reference matches to retrieve the reference peaks 502 from a database (e.g., the database 122 of FIG. 1).

In the illustrated example of FIG. 5, the media identifier 102 compares the query peaks 504 and the reference peaks 502. The media identifier 102 identifies a peak match when one of the query peaks 504 matches one of the reference peaks 502. The media identifier 102 compares the query peaks 504 and the reference peaks 502 at each example time interval 506 to determine a total quantity of peak matches (e.g., a total quantity of matching peaks) corresponding to an identifier of a fingerprint associated with the reference peaks 502. In some examples, the media identifier 102 determines a quantity of peaks that match for a given time as depicted by example graph 508. In FIG. 5, the media identifier 102 may process (e.g., iteratively process) the reference matches as described above to identify the media associated with the media data 402. For example, the media identifier 102 may identify the media based on determining which of the reference matches has the greatest or highest total quantity of peak matches (e.g., the highest quantity of matching peaks).

In some examples, the report generator 270, and/or, more generally, the media identifier 102 identifies the media 104 of FIG. 1 based on determining which of the reference matches has the greatest total quantity of peaks matches. The report generator 270 can generate a report that includes the identification of the media 104. For example, the report generator 270 may store the report in the database 122. In other examples, the report generator 270 can invoke the communication interface 210 to transmit the report to one of the devices 106, 108 to present to a corresponding one of the users 110, 112 the identification of the media 104.

Figure 6:
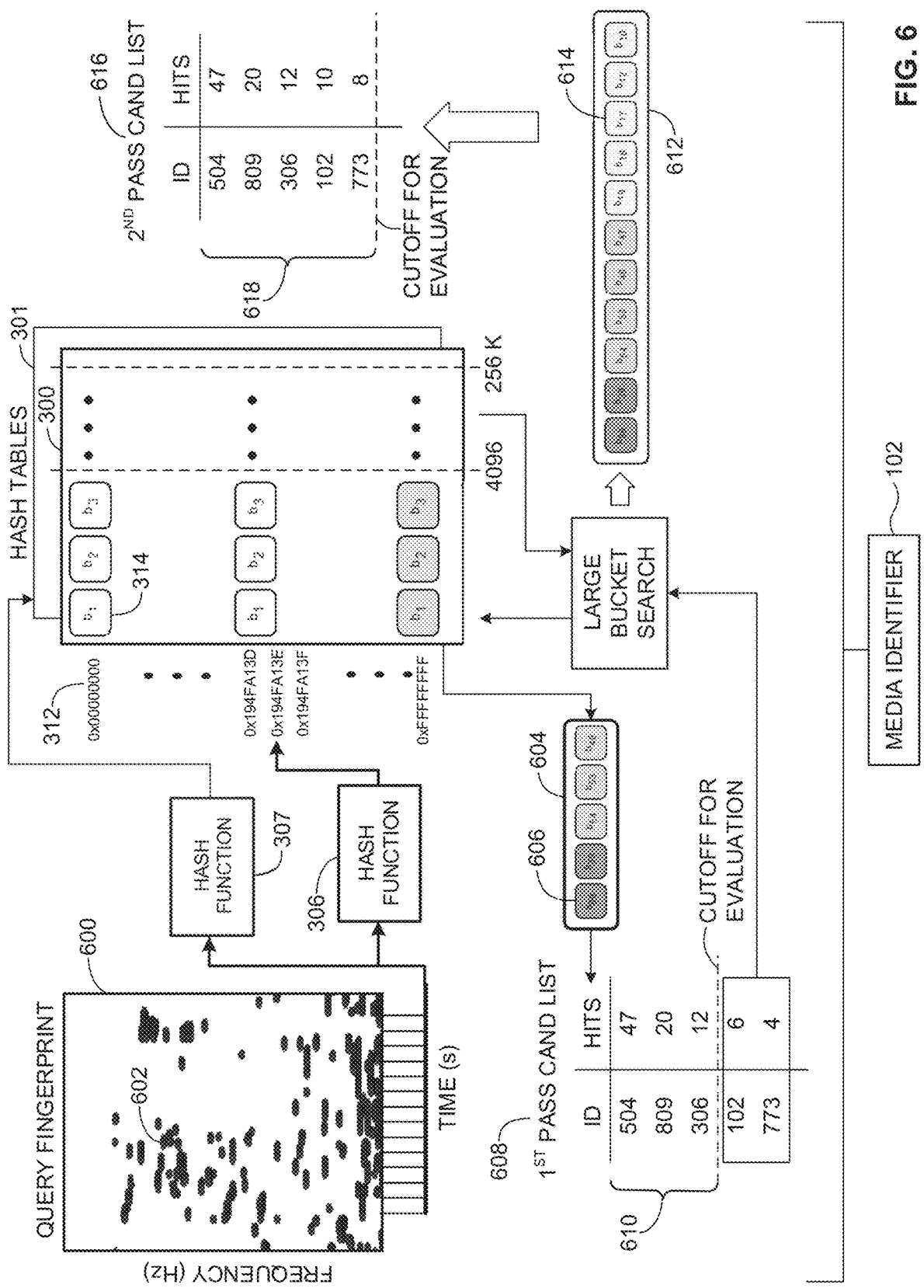
FIG. 6 is a schematic illustration of the example media identifier of FIGS. 1-2 performing a second look-up query using the examples disclosed herein.

FIG. 6 is a schematic illustration of the media identifier 102 of FIGS. 1-2 identifying media associated with an example query fingerprint 600 by performing a multi-round look-up query in the hash tables 300, 301 of FIGS. 3-4. In FIG. 6, the query fingerprint 600 is represented as a spectrogram. The query fingerprint 600 of FIG. 6 corresponds to unknown or unidentified media obtained from the devices 106, 108 of FIG. 1. For example, the query fingerprint 600 may correspond to the media 104 of FIG. 1.

In the illustrated example of FIG. 6, the media identifier 102 performs a first look-up query or a first pass search operation in the hash tables 300, 301 by comparing sets of data points included in example query media data 602 of the query fingerprint 600 to reference data included in the hash tables 300, 301. The media identifier 102 executes the example hash functions 306, 307 of FIGS. 3-4 on the sets of data points to generate hash values for each set. The media identifier 102 identifies corresponding ones of the buckets 312 of the hash tables 300, 301 by mapping the hash values to the hash tables 300, 301. The identified buckets 312 during the first pass search operation can have a first bucket size corresponding to a first quantity of entries less than S. For example, S may have a value of 4096. In such examples, the identified buckets 312 during the first pass search operation can have a quantity of entries less than 4096.

In response to determining the corresponding buckets 312 of the hash tables 300, 301, the media identifier 102 generates a first example reference match set 604 by retrieving example reference data 606 stored in the slots 314 at the corresponding buckets 312. For example, the media identifier 102 may retrieve the reference data 606 when the reference data 606 is at one of the buckets 312 that has a bucket size less than the first bucket size. In such examples, the first bucket size can correspond to 4096 entries, 8192 entries, etc. Alternatively, the first bucket size can correspond to a different quantity of entries.

In the illustrated example of FIG. 6, the media identifier 102 determines a first example candidate list (e.g., a first pass candidate list) 608. The first pass candidate list 608 includes three example candidate matches 610 that correspond to the reference data 606. For example, the three candidate matches 610 have the first bucket size. The media identifier 102 determines that a first candidate match with an identifier of 504, a second candidate match with an identifier of 809, and a third candidate match with an identifier of 306 are candidate matches based on each of the candidate matches having a quantity of hits that satisfy a candidate threshold of 7 hits. The media identifier 102 determines that a first reference match with an identifier of 102 and a second reference match with an identifier of 773 do not satisfy the candidate threshold of 7 hits as the first and second reference matches have 6 hits and 4 hits, respectively, both of which are less than the candidate threshold of 7 hits.

In the illustrated example of FIG. 6, the media identifier 102 determines that the first and second reference matches are boost candidates because the respective hits of 6 and 4 do not satisfy the candidate threshold of 7 hits but satisfies a boost threshold of, for example, 3 hits. Alternatively, any other boost threshold may be used. The boost threshold corresponds to a cutoff for (further) evaluation. In some examples, reference matches that are below the boost threshold are not processed further and, in some examples, may be dropped from consideration or evaluation by the media identifier 102.

In the illustrated example of FIG. 6, the media identifier 102 performs a second look-up query or a second pass search operation using the first and second reference matches, where the first and second reference matches have a number of matches that satisfy the boost threshold but do not satisfy the candidate threshold. For example, the first reference match with the identifier of 102 and the second reference match with the identifier of 773 may be selected to be boosted or further processed to boost the corresponding quantity of hits. The media identifier 102 searches the hash tables 300, 301 using a second bucket size, where the second bucket size is greater than the first bucket size. For example, the media identifier 102 may search the hash tables 300, 301 for reference data included in slots 314 at the buckets 312 that have a bucket size greater than the first bucket size and/or up to the second bucket size. In such examples, the first bucket size can correspond to 4096 entries, 8192 entries, etc., and the second bucket size can correspond to 256,000 entries, 512,000 entries, etc. Alternatively, the first and/or the second bucket size may have a different number of entries.

In response to searching the hash tables 300, 301 based on the second bucket size, the media identifier 102 may generate a second example reference match set 612 by retrieving example, reference data 614 stored in the slots 314 at the corresponding buckets 312, where the corresponding buckets 312 have a bucket size greater than the first bucket size. For example, the media identifier 102 may generate a buffer including at least one of the reference data 606 of the first reference match set 604 or the reference data 614 of the second reference match set 612. The media identifier 102 may process the reference match set 612 by sorting the reference data 614 based on time offset. The media identifier 102 may calculate a quantity of hits by determining a number of times that a media ID associated with a particular music artist, song name, etc., appears in the buffer.

In the illustrated example of FIG. 6, the media identifier 102 determines a second example candidate list (e.g., a second pass candidate list) 616. The second pass candidate list 616 includes the same identifiers of the first pass candidate list 608. Alternatively, the first pass candidate list 608 and the second pass candidate list 616 may have different identifiers. In FIG. 6, the second pass candidate list 616 includes five example candidate matches 618 that correspond to the reference data 606, 614. The five candidate matches 618 include the three candidate matches 610 of the first pass candidate list 608. The media identifier 102 determines that the candidate match with the identifier of 102 that previously had 6 hits now has 10 hits and the candidate match with the identifier of 773 that previously had 4 hits now has 8 hits, both of which satisfy the candidate threshold of 7 hits. For example, the media identifier 102 boosted the candidate match with the identifier of 102 from 6 hits to 10 hits by performing the second look-up query. In such examples, the media identifier 102 can determine that the first reference match having the identifier 102 had a first quantity of hits of 6 based on the first bucket size, a second quantity of hits of 4 based on the second bucket size, and a third quantity of hits of 10 based on adding the first and second quantities of hits. Accordingly, the third quantity of hits of 10 associated with the first reference match satisfies the candidate threshold of 7 hits.

By performing the second look-up query on the reference matches that did not satisfy the candidate threshold, the media identifier 102 identifies the first and second reference matches in the first pass candidate list 610 as a fourth and a fifth candidate match of the second pass candidate list 616, whereas prior systems would have excluded the first and second reference matches and, thus, reduce an accuracy and/or an efficiency of identifying the query fingerprint 600.

Figure 7:
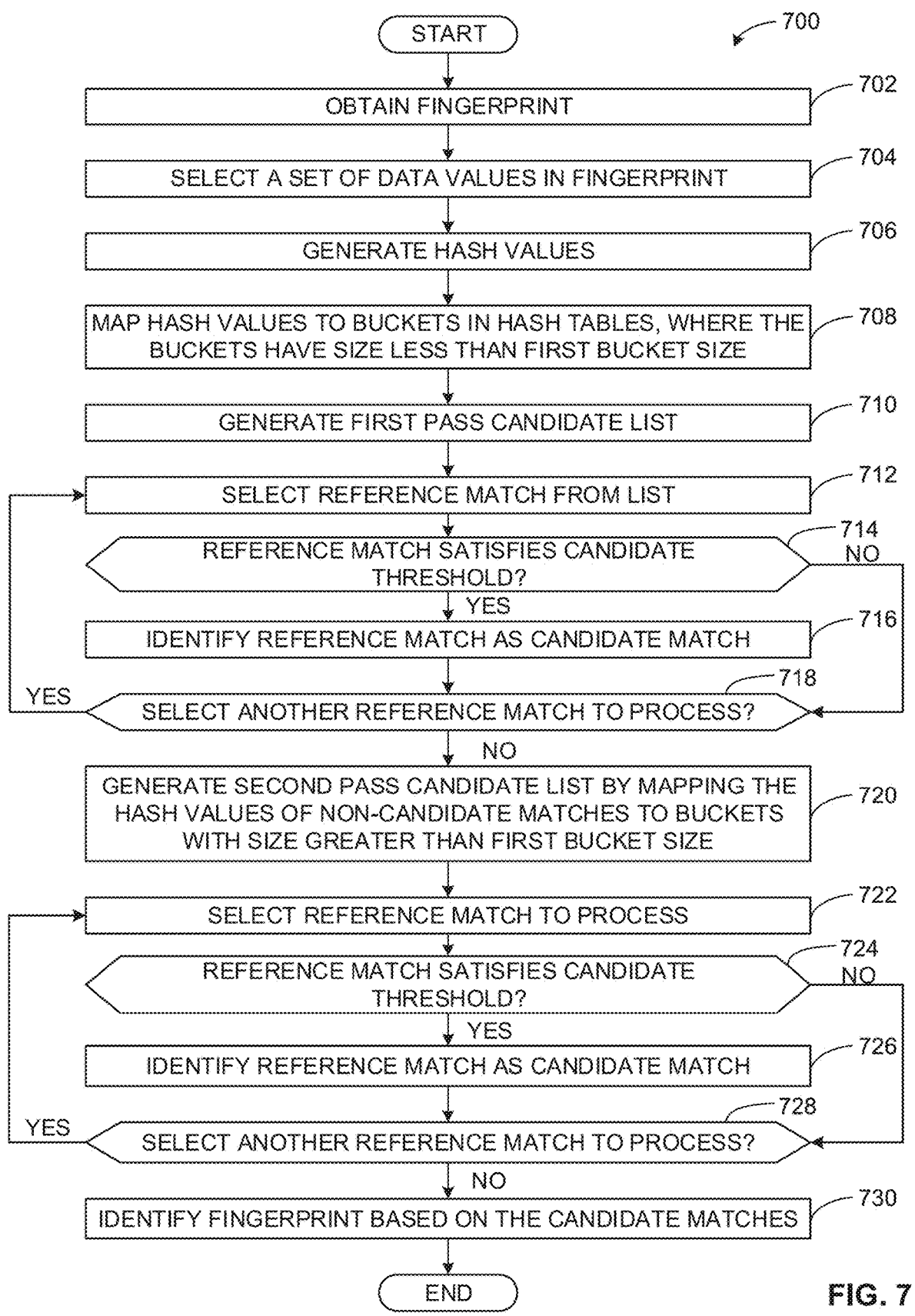
FIG. 7 is a flowchart representative of example machine readable instructions that may be executed to implement the example media identifier of FIGS. 1-2.

A flowchart representative of example hardware logic, machine readable instructions, hardware implemented state machines, and/or any combination thereof for implementing the media identifier 102 of FIGS. 1-6 is shown in FIG. 7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example media identifier 102 may alternatively be used. For example, the order of execution of the blocks may be changed, and/or some of the blocks described may be changed, eliminated, or combined. Additionally or alternatively, any or all of the blocks may be implemented by one or more hardware circuits e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 7 is a flowchart representative of example machine readable instructions 700 that may be executed to implement the media identifier 102 of FIGS. 1-2 to identify the media 104 of FIG. 1. The machine readable instructions 700 begin at block 702, at which the media identifier 102 obtains a fingerprint. For example, the communication interface 210 (FIG. 2) may obtain the query fingerprint 600 from one of the devices 106, 108 of FIG. 1.

At block 704, the media identifier 102 selects a set of data values in a fingerprint. For example, the data selector 230 (FIG. 2) may select a first set of one or more energy values of the query fingerprint 600. At block 706, the media identifier 102 generates hash values. For example, the hash handler 240 (FIG. 2) may execute the hash functions 306, 307 of FIGS. 3-4 and 6 to generate hash values.

At block 708, the media identifier 102 maps the hash values to buckets in hash tables, where the buckets have a size less than a first bucket size. For example, the hash handler 240 may map the hash values to corresponding ones of the buckets 312 of the hash tables 300, 301 of FIGS. 3-4 and 6, where the corresponding ones of the buckets 312 have a first bucket size.

At block 710, the media identifier 102 generates a first pass candidate list. For example, the candidate determiner 260 (FIG. 2) may venerate the first pass candidate list 608 of FIG. 6. At block 712, the media identifier 102 selects a reference match from the list. For example, the candidate determiner 260 may select the reference match of the first pass candidate list 608 that has a media ID of 504 to process.

At block 714, the media identifier 102 determines whether the reference match satisfies a candidate threshold. For example, the candidate determiner 260 may compare the 47 hash hits of the reference match with the media ID of 504 to a candidate threshold of 7 hits. In such examples, the candidate determiner 260 can determine that the 47 hash hits satisfy the candidate threshold of 7 hits because the 47 hash hits are greater than the 7 hash hits of the candidate threshold.

If, at block 714, the media identifier 102 determines that the reference match does not satisfy the candidate threshold, control proceeds to block 718 to determine whether to select another reference match to process. If, at block 714, the media identifier 102 determines that the reference match satisfies the candidate threshold, then, at block 716, the media identifier 102 identifies the reference match as a candidate match. For example, the candidate determiner 260 may identify the reference match with the media ID of 504 as a candidate match as illustrated in FIG. 6.

At block 718, the media identifier 102 determines whether to select another reference match to process. For example, the candidate determiner 260 may select the reference match of the first pass candidate list 608 that has a media ID of 809. If, at block 718, the media identifier 102 determines to select another reference match to process, control returns to block 712 to select another reference match from the list.

If, at block 718, the media identifier 102 determines not to select another reference match to process then, at block 720, the media identifier 102 generates a second pass candidate list by mapping the hash values of non-candidate matches to buckets with size greater than the first bucket size. For example, the non-candidate matches may be the first reference match with the identifier of 102 and the second reference match with the identifier of 773 in the first pass candidate list 608 of FIG. 6. In such examples, the hash handler 240 can map the hash values generated at block 706 for the first and second reference matches to the hash tables 300, 301 at buckets having a second bucket size greater than the first bucket size. In response to the mapping, the candidate determiner 260 may generate the second pass candidate list 616 of FIG. 6 corresponding to boosting the first and second reference matches.

At block 722, the media identifier 102 selects a reference match to process. For example, the candidate determiner 260 may select the reference match having the media ID 102. At block 724, the media identifier 102 determines whether the reference match satisfies the candidate threshold. For example, the candidate determiner 260 may compare the 10 hash hits of the reference match with the media ID of 102 to the candidate threshold of 7 hits. For example, the 10 hash hits may correspond to a third quantity of hash hits that includes (1) a first quantity of 6 hash hits generated by searching the hash tables 300, 301 based on the first bucket size and (2) a second quantity of 4 hash hits generated by searching the hash tables 300, 301 based on the second bucket size. In such examples, the candidate determiner 260 can determine that the 10 hash hits satisfy the candidate threshold 7 hits because the 10 hash hits are greater than the 7 hash hits.

If, at block 724, the media identifier 102 determines that the reference match does not satisfy the candidate threshold, control proceeds to block 728 to determine whether to select another reference match to process. If, at block 724, the media identifier 102 determines that the reference match satisfies the candidate threshold, then, at block 726, the media identifier 102 identifies the reference match as a candidate match. For example, the candidate determiner 260 may identify the media ID of 102 as a candidate match. At block 728, the media identifier 102 determines whether to select another reference match to process. For example, the candidate determiner 260 may select the reference match of the second pass candidate list 616 that has a media ID of 773.

If, at block 728, the media identifier 102 determines to select another reference match to process, control returns to block 722 to select another reference match from the list. If, at block 728, the media identifier 102 determines not to select another reference match to process then, at block 730, the media identifier 102 identifies the fingerprint based on the candidate matches. For example, the report generator 270 may identify the query fingerprint 600 based on comparing the media data 602 of FIG. 6 to the reference data 614 associated with one or more of the candidate matches 618.

FIG. 8 is a block diagram of an example processor platform 800 structured to execute the instructions of FIG. 7 to implement the media identifier 102 of FIGS. 1-6. The processor platform 800 can be, for example, a server, a personal computer, a workstation, a self-learning machine (e.g., a neural network), a mobile device (e.g., a cell phone, a smart phone, a tablet such as an iPad™), or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example communication interface 210, the example data extractor 20, the example data selector 230, the example hash handler 240, the example table handler 250, the example candidate determiner 260, and the example report generator 270 of FIG. 2. Alternatively, the interface 820 may implement the communication interface 210.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In this example, the one or more mass storage devices 828 implement the database 122 of FIG. 1.

The machine executable instructions 832 of FIG. 7 may be stored in the mass storage device 828, in the volatile memory 814, in the non-volatile memory 816, and/or on a removable non-transitory computer readable storage medium such as a CD or Example methods, apparatus, systems, and articles of manufacture to improve media identification are disclosed herein. Further examples and combinations thereof include the following:

Example 1 includes an apparatus to improve media identification, the apparatus comprising a hash handler to generate a first set of reference matches by performing hash functions on a subset of media data included in a fingerprint associated with media to generate hashed media data, the first set of reference matches based on matching the hashed media data to a hash table based on a first bucket size, a candidate determiner to identify a second set of reference matches that include one or more reference matches of the first set, the second set including first reference matches having first quantities of hits that do not satisfy a threshold, determine second quantities of hits for ones of the second set by matching ones of the second set to the hash table based on a second bucket size, the second bucket size different than the first bucket size, and identify one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits, and a report generator to generate a report including an identification of the media associated with the fingerprint based on the one or more candidate matches.

Example 2 includes the apparatus of example 1, further including a communication interface to obtain the fingerprint from a media device when the media is accessed by a user.

Example 3 includes the apparatus of example 1, further including a data extractor to extract one or more audio data values from the fingerprint including at least one of an amplitude, a frequency, or an energy value and generate a spectrogram based on the extracted one or more audio data values.

Example 4 includes the apparatus of example 1, wherein the report generator is to identify the media based on a comparison of first peak values associated with the one or more candidate matches and second peak values associated with the fingerprint.

Example 5 includes the apparatus of example 1, wherein the subset of media data includes one or more energy values, the hash functions including a first hash function, and further including a data selector to select the one or more energy values, wherein the hash handler is to generate the hash table by executing the first hash function on the one or more energy values to generate a first hash value, and further including a table handler to map the first hash value to a bucket of the hash table, determine whether a second hash value is stored at one or more slots of the bucket, and store the first hash value at a first one of the one or more slots when the first one of the one or more slots does not include the second hash value.

Example 6 includes the apparatus of example 1, wherein the report generator is to compare the one or more candidate matches to the first set and the second set of reference matches to determine quantities of matching peaks, identify the media based on one of the one or more candidate matches having a highest quantity of matching peaks out of the one or more candidate matches, and present the identification of the media to a media device that accessed the media.

Example 7 includes a non-transitory computer readable storage medium comprising instructions which, when executed, cause a machine to at least generate a first set of reference matches by performing hash functions on a subset of media data included in a fingerprint associated with media to generate hashed media data, the first set of reference matches based on matching the hashed media data to a hash table based on a first bucket size, identify a second set of reference matches that include one or more reference matches of the first set, the second set including first reference matches having first quantities of hits that do not satisfy a threshold, determine second quantities of hits for ones of the second set by matching ones of the second set to the hash table based on a second bucket size, the second bucket size different than the first bucket size, identify one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits, and generate a report including an identification of the media associated with the fingerprint based on the one or more candidate matches.

Example 8 includes the non-transitory computer readable storage medium of example 7, wherein the instructions, when executed, cause the machine to obtain the fingerprint from a media device when the media is accessed by a user.

Example 9 includes the non-transitory computer readable storage medium of example 7, wherein the instructions, when executed, cause the machine to extract one or more audio data values from the fingerprint including at least one of an amplitude, a frequency, or an energy value and generate a spectrogram based on the extracted one or more audio data values.

Example 10 includes the non-transitory computer readable storage medium of example 7, wherein the instructions, when executed, cause the machine to identify the media based on a comparison of first peak values associated with the one or more candidate matches and second peak values associated with the fingerprint.

Example 11 includes the non-transitory computer readable storage medium of example 7, wherein the subset of media data includes one or more energy values, the hash functions including a first hash function, and the instructions, when executed, cause the machine to generate the hash table by selecting the one or more energy values, executing the first hash function on the one or more energy values to generate a first hash value, mapping the first hash value to a bucket of the hash table, determining whether a second hash value is stored at a slot of the bucket, and storing the first hash value at the slot when the slot does not include the second hash value.

Example 12 includes the non-transitory computer readable storage medium of example 11, wherein the hash table is a first hash table, the bucket is a first bucket, the slot is a first slot, and wherein the instructions, when executed, cause the machine to select the one or more energy values, execute a second hash function on the one or more energy values to generate a second hash value, the second hash function different from the first hash function, map the second hash value to a second bucket of a second hash table, determine whether a fourth hash value is stored at a second slot of the second bucket, and store the second hash value at the second slot when the second slot does not include the fourth hash value.

Example 13 includes the non-transitory computer readable storage medium of example 7, wherein the instructions, when executed, cause the machine to compare the one or more candidate matches to the first set and the second set of reference matches to determine quantities of matching peaks, identify the media based on one of the one or more candidate matches having a highest quantity of matching peaks out of the one or more candidate matches, and present the identification of the media to a media device that accessed the media.

Example 14 includes a method to improve media identification, the method comprising generating a first set of reference matches by performing hash functions on a subset of media data included in a fingerprint associated with media to generate hashed media data, the first set of reference matches based on matching the hashed media data to a hash table based on a first bucket size, identifying a second set of reference matches that include one or more reference matches of the first set, the second set including first reference matches having first quantities of hits that do not satisfy a threshold, determining second quantities of hits for ones of the second set by matching ones of the second set to the hash table based on a second bucket size, the second bucket size different than the first bucket size, identifying one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits, and generating a report including an identification of the media associated with the fingerprint based on the one or more candidate matches.

Example 15 includes the method of example 14, further including obtaining the fingerprint from a media device when the media is accessed by a user.

Example 16 includes the method of example 14, further including extracting one or more audio data values from the fingerprint including at least one of an amplitude, a frequency, or an energy value, and generating a spectrogram based on the extracted one or more audio data values.

Example 17 includes the method of example 14, wherein the identification of the media is based on a comparison of first peak values associated with the one or more candidate matches and second peak values associated with the fingerprint.

Example 18 includes the method of example 14, wherein the subset of media data includes one or more energy values, the hash functions including a first hash function, and generating the hash table includes selecting the one or more energy values, executing the first hash function on the one or more energy values to generate a first hash value, mapping the first hash value to a bucket of the hash table, determining whether a second hash value is stored at a slot of the bucket, and storing the first hash value at the slot when the slot does not include the second hash value.

Example 19 includes the method of example 18, wherein the hash table is a first hash table, the bucket is a first bucket, the slot is a first slot, and further including selecting the one or more energy values, executing a second hash function on the one or more energy values to generate a second hash value, the second hash function different from the first hash function, mapping the second hash value to a second bucket of a second hash table, determining whether a fourth hash value is stored at a second slot of the second bucket, and storing the second hash value at the second slot when the second slot does not include the fourth hash value.

Example 20 includes the method of example 14, further including comparing the one or more candidate matches to the first set and the second set of reference matches to determine quantities of matching peaks, identifying the media based on one of the one or more candidate matches having a highest quantity of matching peaks out of the one or more candidate matches, and presenting the identification of the media to a media device that accessed the media.

From the foregoing, it will be appreciated that example systems, methods, apparatus, and articles of manufacture have been disclosed that improve media identification. The disclosed systems, methods, apparatus, and articles of manufacture improve the efficiency of using a computing device by improving a speed at which the computing device queries a database to identify query media. By performing a multi-round limited bucket lookup, the computing device may increase search depth of one or more databases with improved accuracy and efficiency compared to prior systems. The disclosed methods, apparatus and articles of manufacture are accordingly directed to one or more improvement(s) in the functioning of a computer.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent,

What is claimed is:

1. An apparatus to improve media identification, the apparatus comprising:
    a hash handler to generate a first set of reference matches by performing hash functions on a subset of media data included in a fingerprint associated with media to generate hashed media data, the first set of reference matches based on matching the hashed media data to a hash table based on a first bucket size, ones of the first set of reference matches having a respective quantity of one or more hits to be compared to a threshold;
    a candidate determiner to:
        identify a second set of reference matches that include one or more reference matches of the first set, the second set including first reference matches having first quantities of hits that do not satisfy the threshold;
        determine second quantities of hits for ones of the second set by matching ones of the second set to the hash table based on a second bucket size, the second bucket size different than the first bucket size; and
        identify one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits; and
    a report generator to generate a report including an identification of the media associated with the fingerprint based on the one or more candidate matches.

2. The apparatus of claim 1, further including a communication interface to obtain the fingerprint from a media device when the media is accessed by a user.

3. The apparatus of claim 1, further including a data extractor to extract one or more audio data values from the fingerprint including at least one of an amplitude, a frequency, or an energy value and generate a spectrogram based on the extracted one or more audio data values.

4. The apparatus of claim 1, wherein the report generator is to identify the media based on a comparison of first peak values associated with the one or more candidate matches and second peak values associated with the fingerprint.

5. The apparatus of claim 1, wherein the subset of media data includes one or more energy values, the hash functions including a first hash function, and further including a data selector to select the one or more energy values, wherein the hash handler is to generate the hash table by executing the first hash function on the one or more energy values to generate a first hash value, and further including a table handler to:
  map the first hash value to a bucket of the hash table;
  determine whether a second hash value is stored at one or more slots of the bucket; and
  store the first hash value at a first one of the one or more slots when the first one of the one or more slots does not include the second hash value.

6. The apparatus of claim 1, wherein the report generator is to:
  compare the one or more candidate matches to the first set and the second set of reference matches to determine quantities of matching peaks;
  identify the media based on one of the one or more candidate matches having a highest quantity of matching peaks out of the one or more candidate matches; and
  present the identification of the media to a media device that accessed the media.

7. A non-transitory computer readable storage medium comprising instructions which, when executed, cause a machine to at least:
  generate a first set of reference matches by performing hash functions on a subset of media data included in a fingerprint associated with media to generate hashed media data, the first set of reference matches based on matching the hashed media data to a hash table based on a first bucket size, ones of the first set of reference matches having a respective quantity of one or more hits to be compared to a threshold;
  identify a second set of reference matches that include one or more reference matches of the first set, the second set including first reference matches having first quantities of hits that do not satisfy the threshold;
  determine second quantities of hits for ones of the second set by matching ones of the second set to the hash table based on a second bucket size, the second bucket size different than the first bucket size;
  identify one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits; and
  generate a report including an identification of the media associated with the fingerprint based on the one or more candidate matches.

8. The non-transitory computer readable storage medium of claim 7, wherein the instructions, when executed, cause the machine to obtain the fingerprint from a media device when the media is accessed by a user.

9. The non-transitory computer readable storage medium of claim 7, wherein the instructions, when executed, cause the machine to extract one or more audio data values from the fingerprint including at least one of an amplitude, a frequency, or an energy value and generate a spectrogram based on the extracted one or more audio data values.

10. The non-transitory computer readable storage medium of claim 7, wherein the instructions, when executed, cause the machine to identify the media based on a comparison of first peak values associated with the one or more candidate matches and second peak values associated with the fingerprint.

11. The non-transitory computer readable storage medium of claim 7, wherein the subset of media data includes one or more energy values, the hash functions including a first hash function, and the instructions, when executed, cause the machine to generate the hash table by:
  selecting the one or more energy values;
  executing the first hash function on the one or more energy values to generate a first hash value;
  mapping the first hash value to a bucket of the hash table;
  determining whether a second hash value is stored at a slot of the bucket; and
  storing the first hash value at the slot when the slot does not include the second hash value.

12. The non-transitory computer readable storage medium of claim 11, wherein the hash table is a first hash table, the bucket is a first bucket, the slot is a first slot, and wherein the instructions, when executed, cause the machine to:
  select the one or more energy values;
  execute a second hash function on the one or more energy values to generate a third hash value, the second hash function different from the first hash function;
  map the third hash value to a second bucket of a second hash table;
  determine whether a fourth hash value is stored at a second slot of the second bucket; and
  store the third hash value at the second slot when the second slot does not include the fourth hash value.

13. The non-transitory computer readable storage medium of claim 7, wherein the instructions, when executed, cause the machine to:
  compare the one or more candidate matches to the first set and the second set of reference matches to determine quantities of matching peaks;
  identify the media based on one of the one or more candidate matches having a highest quantity of matching peaks out of the one or more candidate matches; and
  present the identification of the media to a media device that accessed the media.

14. A method to improve media identification, the method comprising:
  generating a first set of reference matches by performing hash functions on a subset of media data included in a fingerprint associated with media to generate hashed media data, the first set of reference matches based on matching the hashed media data to a hash table based on a first bucket size, ones of the first set of reference matches having a respective quantity of one or more hits to be compared to a threshold;
  identifying a second set of reference matches that include one or more reference matches of the first set, the second set including first reference matches having first quantities of hits that do not satisfy the threshold;
  determining second quantities of hits for ones of the second set by matching ones of the second set to the hash table based on a second bucket size, the second bucket size different than the first bucket size;
  identifying one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits; and
  generating a report including an identification of the media associated with the fingerprint based on the one or more candidate matches.

15. The method of claim 14, further including obtaining the fingerprint from a media device when the media is accessed by a user.

16. The method of claim 14, further including:
extracting one or more audio data values from the fingerprint including at least one of an amplitude, a frequency, or an energy value; and
generating a spectrogram based on the extracted one or more audio data values.

17. The method of claim 14, wherein the identification of the media is based on a comparison of first peak values associated with the one or more candidate matches and second peak values associated with the fingerprint.

18. The method of claim 14, wherein the subset of media data includes one or more energy values, the hash functions including a first hash function, and generating the hash table includes:
selecting the one or more energy values;
executing the first hash function on the one or more energy values to generate a first hash value;
mapping the first hash value to a bucket of the hash table;
determining whether a second hash value is stored at a slot of the bucket; and
storing the first hash value at the slot when the slot does not include the second hash value.

19. The method of claim 18, wherein the hash table is a first hash table, the bucket is a first bucket, the slot is a first slot, and further including:
selecting the one or more energy values;
executing a second hash function on the one or more energy values to generate a third hash value, the second hash function different from the first hash function;
mapping the third hash value to a second bucket of a second hash table;
determining whether a fourth hash value is stored at a second slot of the second bucket; and
storing the third hash value at the second slot when the second slot does not include the fourth hash value.

20. The method of claim 14, further including:
comparing the one or more candidate matches to the first set and the second set of reference matches to determine quantities of matching peaks;
identifying the media based on one of the one or more candidate matches having a highest quantity of matching peaks out of the one or more candidate matches; and
presenting the identification of the media to a media device that accessed the media.

21. A non-transitory computer readable storage medium comprising instructions which, when executed, cause a machine to at least:
select one or more energy values included in a first subset of media data;
execute a first hash function on the one or more energy values to generate a first hash value;
map the first hash value to a first bucket of a first hash table;
determine whether a second hash value is stored at a first slot of the first bucket;
store the first hash value at the first slot when the first slot does not include the second hash value to generate the first hash table;
execute a second hash function on the one or more energy values to generate a third hash value, the second hash function different from the first hash function;
map the third hash value to a second bucket of a second hash table;
determine whether a fourth hash value is stored at a second slot of the second bucket;
store the third hash value at the second slot when the second slot does not include the fourth hash value to generate the second hash table;
generate a first set of reference matches by performing hash functions on a second subset of media data included in a fingerprint associated with media to generate hashed media data, the first set of reference matches based on matching the hashed media data to at least one of the first hash table or the second hash table based on a first bucket size, the hash functions including the first hash function and the second hash function;
identify a second set of reference matches that include one or more reference matches of the first set, the second set including first reference matches having first quantities of hits that do not satisfy a threshold;
determine second quantities of hits for ones of the second set by matching ones of the second set to at least one of the first hash table or the second hash table based on a second bucket size, the second bucket size different than the first bucket size;
identify one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits; and
generate a report including an identification of the media associated with the fingerprint based on the one or more candidate matches.

22. A method to improve media identification, the method comprising
selecting one or more energy values included in a first subset of media data;
executing a first hash function on the one or more energy values to generate a first hash value;
mapping the first hash value to a first bucket of a first hash table;
determining whether a second hash value is stored at a first slot of the first bucket;
storing the first hash value at the first slot when the first slot does not include the second hash value to generate the first hash table;
executing a second hash function on the one or more energy values to generate a third hash value, the second hash function different from the first hash function;
mapping the third hash value to a second bucket of a second hash table;
determining whether a fourth hash value is stored at a second slot of the second bucket;
storing the third hash value at the second slot when the second slot does not include the fourth hash value to generate the second hash table;
generating a first set of reference matches by performing hash functions on a second subset of media data included in a fingerprint associated with media to generate hashed media data, the first set of reference matches based on matching the hashed media data to at least one of the first hash table or the second hash table based on a first bucket size, the hash functions including the first hash function and the second hash function;
identifying a second set of reference matches that include one or more reference matches of the first set, the second set including first reference matches having first quantities of hits that do not satisfy a threshold;
determining second quantities of hits for ones of the second set by matching ones of the second set to at least one of the first hash table or the second hash table based on a second bucket size, the second bucket size different than the first bucket size;

identifying one or more candidate matches based on at least one of (1) ones of the first set having the first quantities of hits that satisfy the threshold or (2) ones of the second set having third quantities of hits that satisfy the threshold, the third quantities of hits based on the first quantities of hits and the second quantities of hits; and generating a report including an identification of the media associated with the fingerprint based on the one or more candidate matches.

* * * * *